April 5, 1955  F. E. ALBERTSON  2,705,562
VACUUM FILTER
Filed Dec. 18, 1953  2 Sheets-Sheet 2

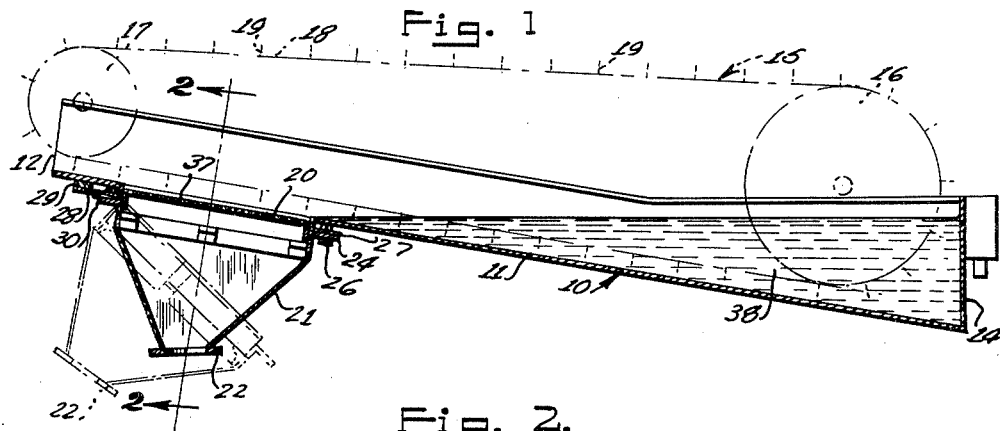
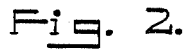
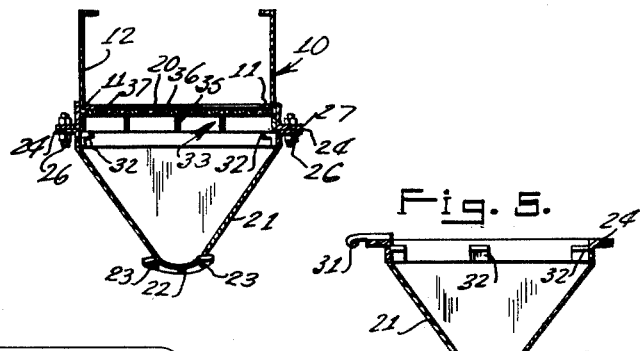
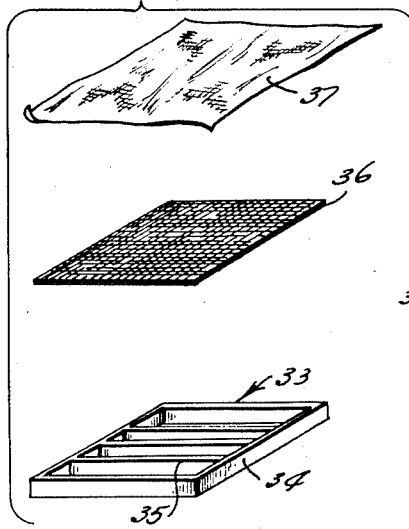
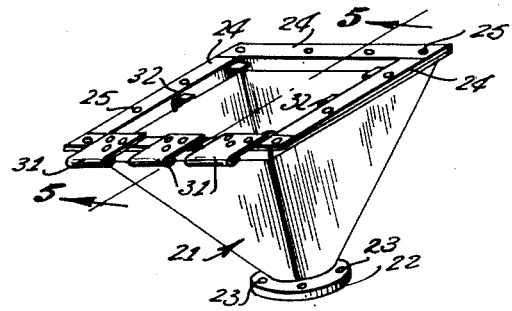
INVENTOR.
Floyd E. Albertson

INVENTOR.
Floyd E. Albertson
BY Victor J. Evans & Co.
ATTORNEYS

United States Patent Office 2,705,562
Patented Apr. 5, 1955

2,705,562

VACUUM FILTER

Floyd E. Albertson, Nicaro Oriente, Cuba

Application December 18, 1953, Serial No. 399,133

2 Claims. (Cl. 209—464)

This invention relates to a separator, and more particularly to a vacuum filter for a separator such as a mechanical classifier, a dewaterer or densifier.

The object of the invention is to provide a vacuum filter for attachment to the bottom of a separator whereby the moisture control of the product can be substantially lowered.

Another object of the invention is to provide a vacuum filter which will permit the water content of the sand or other product to be materially lowered.

A further object of the invention is to provide a vacuum filter which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a longitudinal sectional view taken through a drag classifier and showing the filter of the present invention attached thereto.

Figure 2 is a sectional view taken on the line 2—2 of Figure 1.

Figure 3 is an exploded perspective view showing the parts of the filter.

Figure 4 is a perspective view of the hopper.

Figure 5 is a sectional view taken on the line 5—5 of Figure 4.

Figure 6:
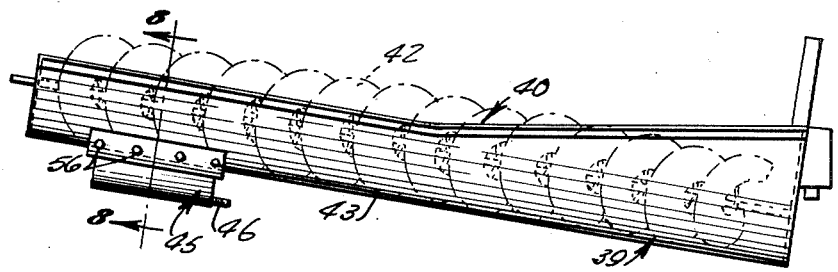
Figure 6 is a longitudinal sectional view taken through a modified separator showing a spiral classifier provided with a vacuum filter.

Referring in detail to Figures 1 through 5 of the drawings, the numeral 10 designates a separator which may be a drag classifier, and the classifier 10 includes an elongated tank which is provided with a bottom wall 11. The tank 10 is inclined so that one end 12 is higher than the other end 14, Figure 1. For coaction with the tank 10 there is provided a suitable conveyor which may include a pair of drums or pulleys 16 and 17, and an endless chain or belt 18 is trained over the drums 16 and 17. Suitable teeth 19 may be carried by or connected to the chain or belt 18 for moving the material from right to left, Figure 1. The bottom wall 11 of the tank is provided with an opening 20.

Positioned below the opening 20 is a hopper or casing 21, Figure 4, and the hopper 21 is provided with a flange 22. The flange 22 is on the lower end of the hopper 21, and the flange 22 is provided with openings 23 for the projection therethrough of bolts whereby the hopper 21 can be readily connected to a conduit or pipe that leads to a suitable source of vacuum or suction. A plurality of flanges 24 are secured to the upper end of the hopper 21, Figure 4, and the flanges 24 are provided with openings 25 for the passage therethrough of bolt and nut assemblies 26. The bolt and nut assemblies 26 also extend through angle irons 27 that are secured to the tank 10.

A bar 28 is secured to the undersurface of the bottom wall 11, and hinge leaves 29 are secured to the bar 28, Figure 1. A plurality of coacting hinge leaves 31 are secured to the hopper 21, and pins 30 serve to pivotally connect the hinge leaves 31 and hinge leaves 29 together. Thus, the hopper 21 can be swung from the solid line position to the broken line position of Figure 1 simply by loosening or removing certain of the bolt and nut assemblies 26 so that the parts within the hopper can be cleaned or replaced as desired. Secured within the hopper 21 adjacent the upper end thereof is a plurality of L-shaped lugs 32 which provide a support for a frame 33, Figure 3. The frame 33 includes a pair of spaced parallel end bars 34 which has a plurality of spaced parallel arms 35 extending therebetween. A perforated plate or screen 36 is supported on the frame 33, and a filter cloth 37 is arranged contiguous to the upper surface of the screen 36. Thus, in use the material 38 in the tank 10 may consist of a mixture of solid particles and fluid or liquid such as water and this material is moved from right to left in Figure 1 by means of the conveyor 15. The fluid will tend to remain in the right hand side of tank 10 due to the inclined arrangement of the tank, but some of the fluid will remain in the solid particles and this moisture or fluid is further removed by applying suction to the hopper 21 so that the material will be substantially lowered in moisture content by the suction effect acting through the frame 33, screen 36 and cloth 37.

Figure 7:
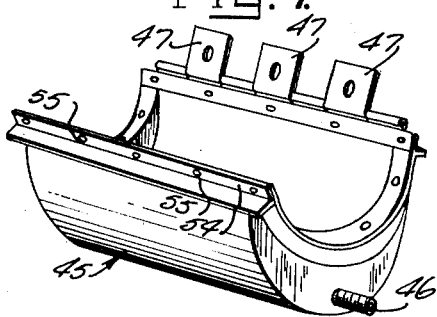
Figure 7 is a perspective view of the hopper for the device of Figure 6.
Figure 8:
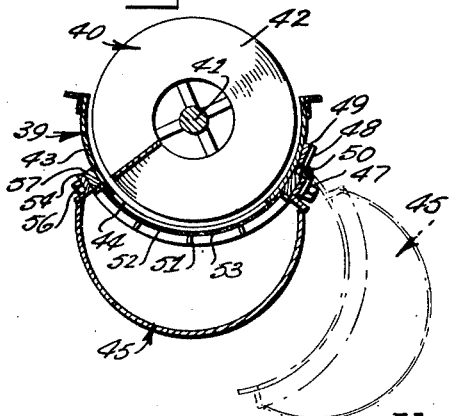
Figure 8 is a sectional view taken on the line 8—8 of Figure 6.

Referring to Figures 6, 7 and 8 there is shown a modification wherein the numeral 39 indicates a spiral classifier which is also inclined so that the left end of the tank is higher than the right end, Figure 6. A spiral conveyor 40 is mounted in the tank 39 in the usual manner, and the conveyor 40 includes a shaft 41 and blades 42. The device 39 includes an arcuate or curved bottom wall 43 which is provided with an opening 44 adjacent the left end, Figure 6.

Positioned below the opening 44 is a hopper or housing 45, Figure 7. A pipe or tube 46 leads from an end of the hopper 45, and the conduit or tube 46 is adapted to be connected to a suitable source of suction or vacuum. Hinge leaves 47 are connected to an edge of the hopper 45, and the hinge leaves 47 are adapted to coact with hinge leaves 48 which are secured to a bar 49, and the bar 49 may be secured to a portion of the bottom wall 43. A pin 50 serves to pivotally connect the hinge leaves 47 to the hinge leaves 48. A frame 51 is supported by the hopper 45, and arranged above the frame 51 is a screen 53 and a filter cloth 52. An angle iron 54 is secured to an edge of the hopper 45, and the angle iron 54 is provided with openings 55 whereby suitable bolts or screws 56 can be extended through the openings 55 and into engagement with a bar 57. Thus, by loosening or removing the bolts 56, the hopper 45 can be pivoted from the solid line position shown in Figure 8 to the broken line position whereby the parts can be cleaned or replaced as desired.

From the foregoing it is apparent that there has been provided a bottom filter for mechanical classifiers, dewaterers or densifiers. The present invention is especially suitable for use with mechanical classifiers used in industry as for example in the field of mineral dressing to effect a separation of fine from coarse material and/or light from heavy material. In general the classifiers consist of a long inclined tank in which rakes or blades are suitably actuated to move settled material along the bottom and discharge it at the upper end as a sand product. The solution or water and the fine material in suspension, if any, overflow the lower end and/or sides into troughs. In normal operation a considerable amount of water is entrained in the sand and in many applications this is undesirable as for example when the sand product must be transported as by conveyor to another section of the plant or where the sand product is discharged directly to drying equipment or where the sand product is returned to a circuit for the purpose of raising or maintaining a certain density of pulp as for example sink float separations. With the present invention there is provided in the bottom of such classifiers a compartment or hopper which is constructed so that as material is moved along the bottom of the tank it is subjected to a vacuum which will remove a substantial part of the solution or water. This hopper 21 or 45 is located between the solution or water level and the upper end of the tank. In Figures 1 through 5 there is shown one form of construction possible on classifiers having a flat bottom steel tank 10 wherein an opening 20 is cut in the bottom of the classifier tank and the hopper 21 is positioned below the opening 20. The hopper may be of suitable material such as sheet metal and the filter media 37 may be of any suitable material as for example cotton duck. As previously stated the hopper can be pivoted away from the bottom of the tank so that repairs can be readily made to the various parts. Suitable gaskets may be used where necessary. A vacuum may be applied by conventional equipment through the bottom of the hopper 21 or 45 through the conduit 46 and the wet material being moved over the surface of the filter will be substantially lowered in moisture content. In Figures 6, 7 and 8 a similar construction is provided for round or curved bottom tanks and the essential parts are shaped or bent to the required form of the tank. The rakes 19 may be attached to the belt 18 which passes over pulleys 16 and 17 and if desired chain and sprockets can be used instead of the belt and pulleys.

I claim:

1. In a drag classifier, an inclined tank including a bottom wall, there being an opening in said bottom wall adjacent an end of said tank, a plurality of angle irons secured to said bottom wall adjacent said opening, a hopper adapted to be connected to a vacuum creating means and including a plurality of hinge leaves hingedly connected to said tank, flanges secured to said hopper and adapted to be secured to said angle irons, a plurality of L-shaped lugs secured within said hopper and spaced from the top thereof, a frame supported on said lugs and including end bars and spaced parallel arms extending between said bars, a screen supported on said frame, and a filter cloth interposed between said bottom wall and said screen.

2. In a drag classifier, a tank including a bottom wall, there being an opening in said bottom wall, a plurality of angle irons secured to said bottom wall, a hopper adapted to be connected to a vacuum creating means and including a plurality of hinge leaves hingedly connected to said tank, flanges secured to said hopper and adapted to be secured to said angle irons, a plurality of lugs secured within said hopper, a frame supported on said lugs and including end bars and arms extending between said bars, a screen supported on said frame, and a filter cloth interposed between said bottom wall and said screen.

References Cited in the file of this patent

UNITED STATES PATENTS

| 964,290 | Maanum | July 12, 1910 |
| 2,328,436 | Eickemeyer | Aug. 31, 1943 |
| 2,460,801 | Bitzer | Feb. 8, 1949 |
| 2,477,404 | Butt | July 26, 1949 |

FOREIGN PATENTS

| 633,684 | Great Britain | Dec. 19, 1949 |